(12) United States Patent
Engelhardt et al.

(10) Patent No.: US 8,415,818 B2
(45) Date of Patent: Apr. 9, 2013

(54) METHOD OF AND APPARATUS FOR COMPENSATION OF OSCILLATION EFFECTS IN THE EVENT OF MAINS ASYMMETRY IN A DOUBLE-FED ASYNCHRONOUS MACHINE

(75) Inventors: Stephan Engelhardt, Sonsbeck (DE); Holger Wrede, Recklinghausen (DE); Andrzej Geniusz, Mülheim an der Ruhr (DE)

(73) Assignee: Woodward Kempen GmbH, Kempen (DE)

( * ) Notice: Subject to any disclaimer, the term of this patent is extended or adjusted under 35 U.S.C. 154(b) by 0 days.

(21) Appl. No.: 12/674,278

(22) PCT Filed: Aug. 9, 2008

(86) PCT No.: PCT/EP2008/060495
§ 371 (c)(1),
(2), (4) Date: Feb. 19, 2010

(87) PCT Pub. No.: WO2009/024489
PCT Pub. Date: Feb. 26, 2009

(65) Prior Publication Data
US 2011/0153092 A1 Jun. 23, 2011

(30) Foreign Application Priority Data

Aug. 22, 2007 (DE) .......................... 10 2007 039 697

(51) Int. Cl.
*H02P 9/00* (2006.01)
(52) U.S. Cl. ............................................. 290/44; 322/37
(58) Field of Classification Search .................... 290/43, 290/44, 54, 55; 322/37, 44
See application file for complete search history.

(56) References Cited

U.S. PATENT DOCUMENTS 5,227,713 A * 7/1993 Bowler et al. ................. 322/58
6,202,776 B1 * 3/2001 Masberg et al. ........... 180/65.22
(Continued)

FOREIGN PATENT DOCUMENTS
DE 102007005165 8/2007

OTHER PUBLICATIONS

H. Wrede: "Beiträge zur Erhöhung von Versorgungssicherheit und Spannungsqualität in der Übertragung und Verteilung elektrischer Energie durch leistungselektronische Betriebsmittel", Dissertation, Bochum, German, 2003.

(Continued)

*Primary Examiner* — Nicholas Ponomarenko
(74) *Attorney, Agent, or Firm* — Henry M Feiereisen LLC (57) ABSTRACT

In a method for the compensation of rotor torque oscillations upon the occurrence of mains asymmetries in relation to a double-fed asynchronous machine (1) it is provided that at least one respective currently prevailing machine parameter is measured and/or derived, the at least one machine parameter is respectively decomposed by calculation into a positive and a negative sequence system component and optionally a DC component, and for the positive sequence system component, the negative sequence system component and optionally for the DC component of the at least one machine parameter, there are respective separate control members for controlling an adjusting value, to which the respective components of the machine parameters are fed as input components and the output values of which are additively superposed. In that case the control members are so adapted for controlling the adjusting value in such a way that the torque oscillations are counteracted. Alternatively there is provided a control member to which the cross-product of the positive sequence system components and negative sequence system components as well as the cross-product of the negative sequence system components and positive sequence system components are fed as an input value, the control member being so adapted for controlling the adjusting value in such a way that second-order torque oscillations are counteracted.

17 Claims, 5 Drawing Sheets

U.S. PATENT DOCUMENTS

| | | | |
|---|---|---|---|
| 6,448,735 B1 * | 9/2002 | Gokhale et al. | 318/700 |
| 6,741,059 B2 * | 5/2004 | Gokhale et al. | 318/700 |
| 7,173,399 B2 * | 2/2007 | Sihler et al. | 322/40 |
| 7,525,292 B2 * | 4/2009 | Lombardi et al. | 322/17 |
| 7,808,215 B2 * | 10/2010 | Markunas et al. | 322/44 |
| 7,939,956 B1 * | 5/2011 | Larsen | 290/44 |
| 8,207,623 B2 * | 6/2012 | Rivas et al. | 290/44 |
| 8,249,852 B2 * | 8/2012 | Thulke | 703/18 |
| 8,264,094 B2 * | 9/2012 | Rivas et al. | 290/44 |
| 8,294,288 B2 * | 10/2012 | Rivas et al. | 290/44 |
| 2003/0218441 A1 | 11/2003 | Kalman et al. | |
| 2004/0128105 A1 | 7/2004 | Harke | |
| 2009/0267572 A1 | 10/2009 | Engelhardt | |
| 2011/0285130 A1 * | 11/2011 | Thisted | 290/44 |

OTHER PUBLICATIONS

S.M.-Engelhardt et al.: "Leistungsregelung von Windkraftanlagen mit doppelt-gespeister Asynchronmaschine bei Netzunsymmetrie", in: VDI-Berichte No. 1963, 2006.

Y. Zhou et al.: "Control of DFIG under Unsymmetrical Volatge Dip", in: PESC, 2007.

T.K. Brekken et al.: "Control of a Doubly Fed Induction Wind Generator Under Unbalanced Grid Voltage Conditions", in: IEEE Transactions on Energy Conversion, vol. 22, No. 1, Mar. 2007.

Iwanski et al.: "Positive and Negative Sequence Based Sensorless Control for Stand-Alone Slip-Ring Generator", in: EPE-PEMC, 2006.

Rodriguez et al.: "Fault Ride—Through Capability Implementation In Wind Turbine Converters Using a Decoupled Double Synchronous Reference Frame PLL", in: Power Electronics and Applications, European Conference, Sep. 2007.

* cited by examiner

METHOD OF AND APPARATUS FOR COMPENSATION OF OSCILLATION EFFECTS IN THE EVENT OF MAINS ASYMMETRY IN A DOUBLE-FED ASYNCHRONOUS MACHINE

CROSS-REFERENCES TO RELATED APPLICATIONS

This application is the U.S. National Stage of International Application No. PCT/EP2008/060495, filed Aug. 9, 2008, which designated the United States and has been published as International Publication No. WO 2009/024489 and which claims the priority of German Patent Application, Serial No. 10 2007 039 697.1, filed Aug. 22, 2007, pursuant to 35 U.S.C. 119(a)-(d).

BACKGROUND OF THE INVENTION

The present invention concerns a method for the compensation of rotor torque harmonics, and an apparatus for carrying out the method.

Double-fed asynchronous machines are used preferably in variable-speed systems, for example in high-power wind power installations, as a wave generator or in conjunction with flywheel mass storage means and uninterruptible power supplies. In general in such installations the stator of the asynchronous machine is connected to the mains and the rotor is connected to a converter by way of slip rings. With such a converter a reference value of an electrical parameter can be impressed into the rotor. In general modern installations have a machine-side converter and a mains-side converter which are connected together by way of an intermediate circuit. The advantage of the double-fed asynchronous machine over comparable systems lies in the reduced building work involved in the converter in comparison with the total power which can be fed into a mains. That provides that a system having a double-fed asynchronous machine has a comparatively high level of efficiency.

In the course of the increasing number of wind power installations and the demands of the mains operators, which are linked thereto and which are ever increasing, the performance of the double-fed asynchronous machine in the event of mains asymmetries is increasingly of interest. As, in a double-fed asynchronous machine, the stator of the machine is connected directly to the mains, mains asymmetries result in asymmetric stator field distributions, this leading to unwanted reactions on the rotor field and the converters.

In the event of an asymmetric mains voltage in particular harmonics occur, especially harmonic oscillations at double the mains frequency, which have a detrimental effect in terms of the mechanism as the harmonic oscillations generate corresponding torque oscillations which in particular heavily load the transmission.

Besides the harmonic oscillations at double the mains frequency, which are primarily discussed hereinafter, unwanted higher harmonics can also occur—generally at lower amplitude—; this primarily involves the sixth and twelfth harmonics.

SUMMARY OF THE INVENTION

The object of the present invention is to detect the harmonics caused by asymmetric mains voltage and to counteract same directly by a control procedure.

According to one aspect of the invention, the aforementioned object is attained by a method for the compensation of rotor torque harmonics, in particular in the region of the second harmonics, upon the occurrence of network asymmetries in relation to a double-fed asynchronous machine, wherein the machine has a frequency converter actuated by a control unit, the control unit controlling the converter in regard to a predetermined control strategy, wherein a) at least one currently prevailing machine parameter is measured and/or derived from machine measurement parameters, b) the at least one machine parameter is decomposed by calculation into a positive and a negative sequence system component and optionally a DC component, c1) for the positive sequence system component, the negative sequence system component and for the DC component of the at least one machine parameter there are respectively provided separate control members for control an adjusting value, to which the respective components of the machine parameter are fed as input components and the output values of which are additively superposed, wherein the control members are so adapted for controlling the adjusting value in such a way that the torque oscillations are counteracted, and/or c2) there is provided at least one control member to which the cross-product of the positive sequence system component and the negative sequence system component and the cross-product of the negative sequence system component and the positive sequence system component of the at least one machine parameter is fed as an input value, the control member being so adapted for controlling the adjusting value in such a way that second-order torque oscillations are counteracted.

According to another aspect of the invention, the aforementioned object is attained by a correspondingly designed control unit for controlling a double-fed asynchronous machine, in the event of occurrence of network asymmetries, wherein the machine has a frequency converter actuated by a control unit, the control unit controlling the converter in regard to a predetermined control strategy, wherein the control unit is adapted to carry out a method as described above.

Advantageous configurations of the invention are apparent from the appendant claims.

It is provided in accordance with the invention that at least one respective currently prevailing machine parameter is measured and/or is derived from other machine measurement parameters and the at least one of said machine parameters is decomposed by calculation respectively into a positive sequence system component, a negative sequence system component and optionally a DC component.

In accordance with an embodiment of the invention (see step (c1) in claim 1), for the positive sequence system components, the negative sequence system components and for the DC components of the at least one machine parameter, there are respectively separate control members for controlling an adjusting value, with which the respective components of the machine parameters are fed as input components and the output values of which are additively superimposed, wherein the control members are so designed for controlling the adjusting value in such a way that the torque oscillations are counteracted.

In a preferred embodiment of the invention as set forth in claim 4 which however can also be implemented independently of the preceding claims, regulation of the rotor voltage of a double-fed asynchronous machine is effected in such a way that the modal pendulum moments are eliminated either having regard to the DC components or with disregard of the DC components (see cases (c1 i) and c1 ii) as set forth in claim 4).

When the DC components of the pendulum moments are taken into consideration the resulting torque is necessarily zero and an additional torque regulation is not possible.

When the DC components are disregarded, it is possible to controllably introduce an adaptable phase shift between stator and rotor so that the resulting torque is not necessarily zero and at the same time a torque regulation can also be effected.

In an alternative embodiment of the invention as set forth in claim 5 there is provided at least one control member to which the cross-product of the positive sequence system values or components and the negative sequence system values or components as well as the cross-product of the negative sequence system values or components and the positive sequence system values or components is fed as an input value, wherein that control member is adapted to regulate the adjusting value in such a way that second-order torque oscillations are counteracted.

BRIEF DESCRIPTION OF THE DRAWING

The invention is described in greater detail hereinafter by way of example with reference to the Figures in which.

DETAILED DESCRIPTION OF PREFERRED EMBODIMENTS

Figure 1:
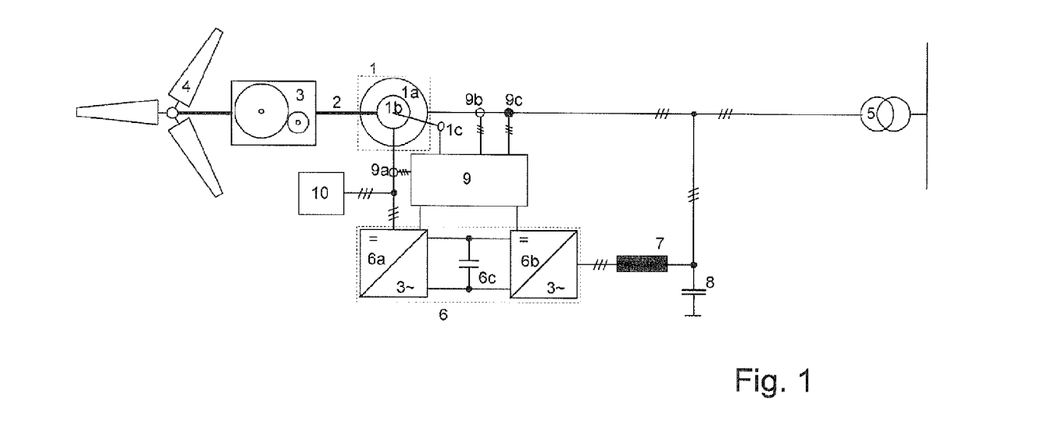
FIG. 1 shows a diagrammatic view of a double-fed asynchronous machine with the associated control and power electronics.

FIG. 1 diagrammatically shows a system having a double-fed asynchronous machine 1. The double-fed asynchronous machine 1 has a stator 1a and a rotor 1b. In addition a position sender 1c is mounted to the machine. The rotor of the asynchronous machine is coupled mechanically to a drive by way of a shaft 2 and a transmission 3. The drive shown in FIG. 1 represents the rotor blades 4 of a wind power installation. The stator 1a is connected to the mains by way of a mains transformer 5. The rotor 1b is electrically connected to a converter 6 and the converter is connected to the mains transformer 5 by way of a choke 7 and a mains filter 8. The machine-side converter 6a and the mains-side converter 6b are coupled together by way of a voltage intermediate circuit 6c. The converter is actuated by way of a control unit 9.

FIG. 1 also shows the measurement locations for the rotor current 9a, the stator current 9b and the stator voltage 9c. The measurement values are passed to the control unit 9. The rotor position is also made available to the control unit, by the position sender 1c. To protect the converter from overloads a so-called crowbar 10 can be arranged between the machine-side converter 6a and the rotor 1b.

Figure 2:
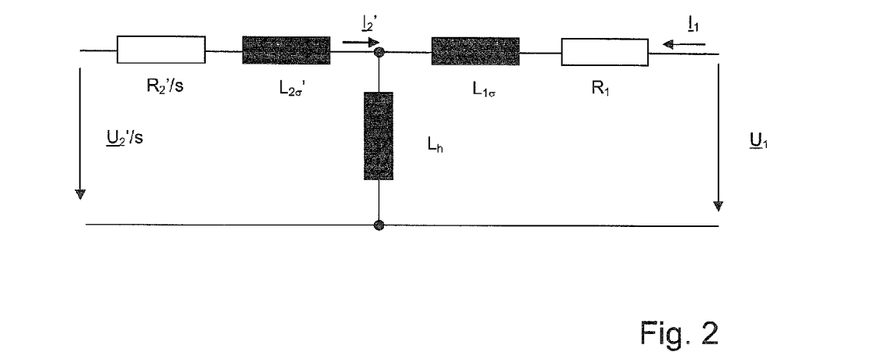
FIG. 2 shows an equivalent-circuit diagram of the double-fed asynchronous machine, FIGS. 3a and b show high-level diagrams of two embodiments of the control method according to the invention.

Modal Description of the Asynchronous Machine:

The general linear equivalent-circuit diagram of the asynchronous machine, as shown in FIG. 2 and known from the literature, with the assumptions and simplifications described therein, is to apply for the following description in respect of control procedure. By virtue of the presumed linearity the superpositioning principle applies and non-symmetrical events can be more clearly represented by means of modal transformation (see DIN 13321, components in three-phase mains networks).

In addition the machine model applies to any stator frequencies; thus it is also possible to simply describe multi-frequency systems on the basis of the superpositioning principle, for example:

$$\underline{U}_1 = \underline{U}_{1p} + \underline{U}_{1n} + \underline{U}_{1dc}$$

$\underline{U}_{1p}$: positive sequence system component $\underline{U}_{1n}$: negative sequence system component $\underline{U}_{1dc}$: DC system component  (1)

This means for the regulator design that a parallel control circuit can be employed on the modal components of the respective frequencies which are of interest in terms of control procedure. The adjusting values of the parallel control circuits are then added up to give a total adjusting signal.

The embodiment describes torque regulation which in the event of mains-frequency asymmetry and the occurrence of a direct current component, as a consequence of transient mains voltage changes, suppresses pendulum moments.

In accordance with the regulator design there are provided three parallel control circuits:
I. torque control circuit for mains-frequency positive sequence system components,
II. torque control circuit for mains-frequency negative sequence system components,
III. torque control circuit for direct-current components.

The equivalent-circuit diagram shown in FIG. 1 applies for all control circuits, with the following definitions for variable slip ('s')

$$s_p = \frac{\omega_{Network} - p \cdot \Omega_{mech}}{\omega_{Network}} \quad (2)$$

$$s_n = \frac{\omega_{Network} + p \cdot \Omega_{mech}}{\omega_{Network}} = 2 - s_p \quad (3)$$

$$s_{dc} = \frac{0 + p \cdot \Omega_{mech}}{\omega_{Network}} = 1 - s_p \quad (4)$$

with
$s_p$: slip positive sequence system
$s_n$: slip negative sequence system
$s_{dc}$: slip DC component
$\omega_N$: mains angular frequency
p: number of pairs of poles
$\Omega_{mech}$: mechanical rotary angular frequency A very important property of the machine can already be deduced from those equations if the voltage drops at the series impedances are disregarded:

$$U_{2p}' \approx s_p U_{1p}$$

$$f_{2p} = s_p f_1 = s_p f_{Network}$$

$$U_{2n}' \approx (2 - s_p) U_{1n}$$

$$f_{2n} = s_n f_1 = (2-s_p) f_{Network}$$

$$U_{2dc}' \approx (1-s_p) U_{1dc}$$

$$f_{2dc} = s_d f_1 = (1-s_p) f_{Network} \quad (5\text{a-c})$$

The rotor frequency for controlling the negative sequence system and DC components is substantially higher than the rotor frequency for controlling the positive sequence system component. Thus the required regulator or rotor voltage in the negative sequence system and in the DC system, for compensation of the associated modal component of the stator voltage, is also significantly higher than in the positive sequence system for the usual working range of $-0.33 < s_p < 0.33$.

A particular limitation on the system lies in restricting the adjusting voltage on the rotor side by the maximum permissible intermediate circuit voltage.

When higher modal components occur in the negative sequence or DC system that requires proportionate distribution of the adjusting signal to the components to be regulated.

Determining the Torque

The general equation for the air gap moment of the asynchronous machine is:

$$M = 3 p L_{1h} I_1 I_2' \sin\gamma = 3 p L_{1h} (\underline{I}_1 \times \underline{I}_2') \vec{e}_z$$

$$\sin\gamma = \cos\angle(j\underline{I}_2'; \underline{I}_1) \quad (6)$$

$\vec{e}_z$: unit vector perpendicularly to the spatial vector plane

Alternatively the equation can be transformed to:

$$M = -3 p L_{1h} (\underline{I}_1 \times \underline{I}_2') \vec{e}_z \quad (7\text{a-c})$$

$$= -3 p \frac{L_{1h}}{L_1 L_2 - L_h^2} (\underline{\psi}_1 \times \underline{\psi}_2') \vec{e}_z$$

with $$\underline{\psi}_1 = L_1 \underline{I}_1 + L_h \underline{I}_2'$$

$$\underline{\psi}_2' = L_h \underline{I}_1 + L_2 \underline{I}_2'$$

This means that there is no torque if the stator and rotor flux are in phase as then the vector product is "0".

The vector product $(\psi_1 \times \psi_2')$ is afforded with the modal decomposition in accordance with (1) as:

$$(\underline{\psi}_1 \times \underline{\psi}_2') = ((\underline{\psi}_{1p} + \underline{\psi}_{1n} + \underline{\psi}_{1dc}) \times (\underline{\psi}_{2p}' + \underline{\psi}_{2n}' + \underline{\psi}_{2dc}')) \quad (8)$$

$$= \underline{\psi}_{1p} \times \underline{\psi}_{2p}' + \underline{\psi}_{1n} \times \underline{\psi}_{2n}' + \underline{\psi}_{1dc} \times \underline{\psi}_{2dc}' +$$

$$\underline{\psi}_{1p} \times \underline{\psi}_{2dc}' + \underline{\psi}_{1dc} \times \underline{\psi}_{2p}' +$$

$$\underline{\psi}_{1n} \times \underline{\psi}_{2dc}' + \underline{\psi}_{1dc} \times \underline{\psi}_{2n}' +$$

$$\underline{\psi}_{1p} \times \underline{\psi}_{2n}' + \underline{\psi}_{1n} \times \underline{\psi}_{2p}'$$

The first three products of the decomposition, in the steady-state condition, form a constant torque, the following four products with the DC components are at mains frequency; the last two generate a torque at double the mains frequency.

The most straightforward method of suppressing the non-constant torques is controlling the rotor flux to '0', but as a result the total moment is regulated to '0' and the machine is operated in a severely under-regulated mode of operation. That high level of reactive power input is generally unwanted or prohibited.

A more mains-friendly method is extinction of the mutually complementary products of the modal components:

$$\underline{\psi}_{1p} \times \underline{\psi}_{2dc}' + \underline{\psi}_{1dc} \times \underline{\psi}_{2p}' \stackrel{!}{=} 0 \quad (9\text{a-c})$$

$$\underline{\psi}_{1n} \times \underline{\psi}_{2dc}' + \underline{\psi}_{1dc} \times \underline{\psi}_{2n}' \stackrel{!}{=} 0$$

$$\underline{\psi}_{1p} \times \underline{\psi}_{2n}' + \underline{\psi}_{1n} \times \underline{\psi}_{2p}' \stackrel{!}{=} 0$$

Those equations can be transformed to:

$$\underline{\psi}_{1p} \times \underline{\psi}_{2dc}' \stackrel{!}{=} \underline{\psi}_{2p}' \times \underline{\psi}_{1dc} \quad (10\text{a-c})$$

$$\underline{\psi}_{1n} \times \underline{\psi}_{2dc}' \stackrel{!}{=} \underline{\psi}_{2n}' \times \underline{\psi}_{1dc}$$

$$\underline{\psi}_{1p} \times \underline{\psi}_{2n}' \stackrel{!}{=} \underline{\psi}_{2p}' \times \underline{\psi}_{1n}$$

Those conditions can be met with:

$$\frac{|\underline{\psi}_{1p}|}{|\underline{\psi}_{2p}'|} \stackrel{!}{=} \frac{|\underline{\psi}_{1dc}|}{|\underline{\psi}_{2dc}'|} \quad (11\text{a})$$

$$\angle \underline{\psi}_{2p}' = \angle \underline{\psi}_{1p} + \phi_0 \quad (11\text{b})$$

$$\angle \underline{\psi}_{2dc}' = \angle \underline{\psi}_{1dc} \, \phi_0 \quad (11\text{c})$$

$$\frac{|\underline{\psi}_{1n}|}{|\underline{\psi}_{2n}'|} \stackrel{!}{=} \frac{|\underline{\psi}_{2dc}'|}{|\underline{\psi}_{1dc}'|} \quad (11\text{d})$$

$$\angle \underline{\psi}_{2n}' = \angle \underline{\psi}_{1n} + \phi_0 \quad (11\text{e})$$

$$\angle \underline{\psi}_{2dc}' = \angle \underline{\psi}_{1dc} \, \phi_0 \quad (11\text{f})$$

$$\frac{|\underline{\psi}_{1p}|}{|\underline{\psi}_{2p}'|} \stackrel{!}{=} \frac{|\underline{\psi}_{1n}|}{|\underline{\psi}_{2n}'|} \quad (11\text{g})$$

$$\angle \underline{\psi}_{2p}' = \angle \underline{\psi}_{1p} + \phi_0 \quad (11\text{h})$$

$$\angle \underline{\psi}_{2n}' = \angle \underline{\psi}_{1n} \, \phi_0 \quad (11\text{i})$$

$\phi_0$: constant angle

A distinction must be drawn between the following two cases:

a) immediately after a voltage change there are DC components, all pendulum moments are to be suppressed;

b) asymmetry after decay of the DC components or disregard of the pendulum moments by virtue of the DC components.

Solution for a):

The equations can only be simultaneously fulfilled if the following apply:

$$\frac{|\underline{\psi}_{1p}|}{|\underline{\psi}_{2p}'|} = \frac{|\underline{\psi}_{1n}|}{|\underline{\psi}_{2n}'|} = \frac{|\underline{\psi}_{1dc}|}{|\underline{\psi}_{2dc}'|} \quad (12\text{a-e})$$

$$\phi_0 = 0$$

$$\angle \underline{\psi}_{2p}' = \angle \underline{\psi}_{1p}$$

$$\angle \underline{\psi}_{2n}' = \angle \underline{\psi}_{1n}$$

$$\angle \underline{\psi}_{2dc}' = \angle \underline{\psi}_{1dc}$$

With this solution the constant moment is also at any event compelled to be "0".

Limitation of the rotor voltage:

The relationship values $$\frac{|\underline{\psi}_{1p}|}{|\underline{\psi}'_{2p}|}, \frac{|\underline{\psi}_{1n}|}{|\underline{\psi}'_{2n}|}, \frac{|\underline{\psi}_{1dc}|}{|\underline{\psi}'_{2dc}|}$$

can be determined having regard to the maximum adjusting value of the rotor voltage.

The magnitude of the total rotor voltage of the modal components may not exceed the maximum magnitude:

$$|\underline{U}_2| = |\underline{U}_{2p} + \underline{U}_{2n} + \underline{U}_{2dc}| \leq U_{2,max} \qquad (13)$$

A simplified and adequate estimate of the components can be implemented on the basis of the quasi-static rotor voltages which are induced by the stator flux modal components impressed by the mains, having regard to (5) and disregarding the stray inductances:

$$\frac{|\underline{\psi}_{1p}|}{|\underline{\psi}'_{2p,ideal}|} = \frac{|\underline{\psi}_{1n}|}{|\underline{\psi}'_{2n,ideal}|} = \frac{|\underline{\psi}_{1dc}|}{|\underline{\psi}'_{2dc,ideal}|} \stackrel{!}{=} 1 \qquad (14)$$

Accordingly the required adjusting value is:

$$|\underline{U}_{2p,ideal}| \approx 2\pi f_{2p}|\psi'_{2p,ideal}| = 2\pi s_p f_{Network}|\psi_{1p}| \qquad (15a\text{-}d)$$

$$|\underline{U}_{2n,ideal}| \approx 2\pi f_{2n}|\psi'_{2n,ideal}| = 2\pi(2-s_p)f_{Network}|\psi_{1n}|$$

$$|\underline{U}_{2dc,ideal}| \approx 2\pi f_{2dc}|\psi'_{2dc,ideal}| = 2\pi(1-s_p)f_{Network}\left|\frac{\psi_{1d}}{c}\right|$$

$$|\underline{U}_{2,ideal}| = |\underline{U}_{2p,ideal}| + |\underline{U}_{2n,ideal}| + |\underline{U}_{2dc,ideal}|$$

If that voltage is greater than that available there must be a reduction in the components. The reduction factor is:

$$k_{red} = \frac{U_{2,max}}{|\underline{U}_{2,ideal}|} \qquad (17)$$

The flux relationships can now be calculated therefrom in accordance with (12a) as:

$$\frac{|\underline{\psi}_{1p}|}{|\underline{\psi}'_{2p}|} = \frac{|\underline{\psi}_{1n}|}{|\underline{\psi}'_{2n}|} = \frac{|\underline{\psi}_{1dc}|}{|\underline{\psi}'_{2dc}|} = \frac{1}{k_{red}} \qquad (18)$$

That means that magnitude, frequency and phase position of the rotor flux components to be set are uniquely determined and based thereon can be set with a modal rotor flux regulator.

Solution for b):

$$\frac{|\underline{\psi}_{1p}|}{|\underline{\psi}'_{2p}|} = \frac{|\underline{\psi}_{1n}|}{|\underline{\psi}'_{2n}|} \qquad (18a\text{-}c)$$

$$\angle \underline{\psi}'_{2p} = \angle \underline{\psi}_{1p} + \phi_0$$

$$\angle \underline{\psi}'_{2n} = \angle \underline{\psi}_{1n} - \phi_0$$

By means of the displacement angle $\phi_0$ it is possible to set a specific torque so that torque regulation remains possible. Possible pendulum moments as a consequence of DC components are not suppressed.

Depending on the respective preference solution a) or b) may be preferred; in particular immediately after occurrence of the asymmetry regulation can be effected in accordance with solution a) and later after decay of the DC components regulation can be effected in accordance with solution b).

Figure 3A:
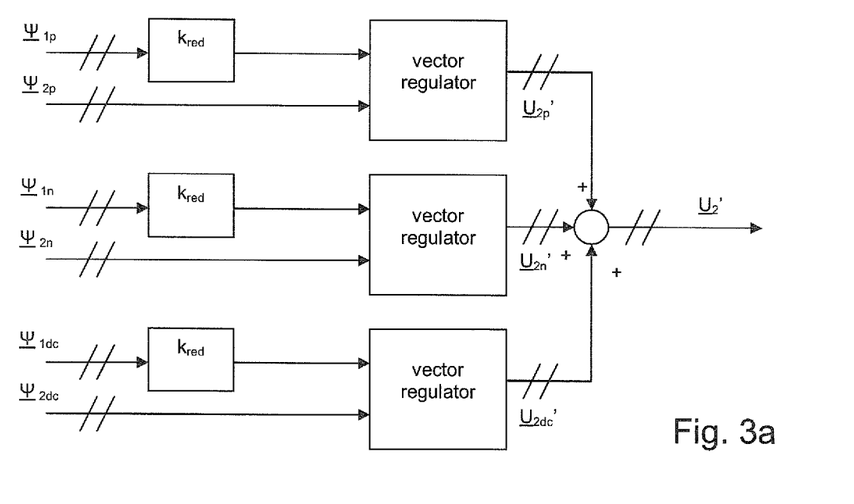

Reference will be made to the overview illustrations in FIGS. 3a and 3b in order firstly to describe modal rotor flux regulators according to the invention:

In the case of the control variant shown in FIG. 3a (corresponding to above-discussed case a)), the positive sequence system, negative sequence system and DC spatial vector components of stator and rotor flux are so regulated that the respective components respectively differ in respect of magnitude only by the factor $k_{red}$, but are mutually superposed in respect of phase position. The factor $k_{red}$ is determined from the maximum available adjusting value in respect of the rotor voltage. The three vector regulators operate in parallel, in which case the output values are summed and are then impressed as a rotor voltage. That case enforces, in accordance with the foregoing derivation, that the air gap moment is always zero. Parallel torque regulation of the asynchronous machine is therefore not possible in this case.

Figure 3B:
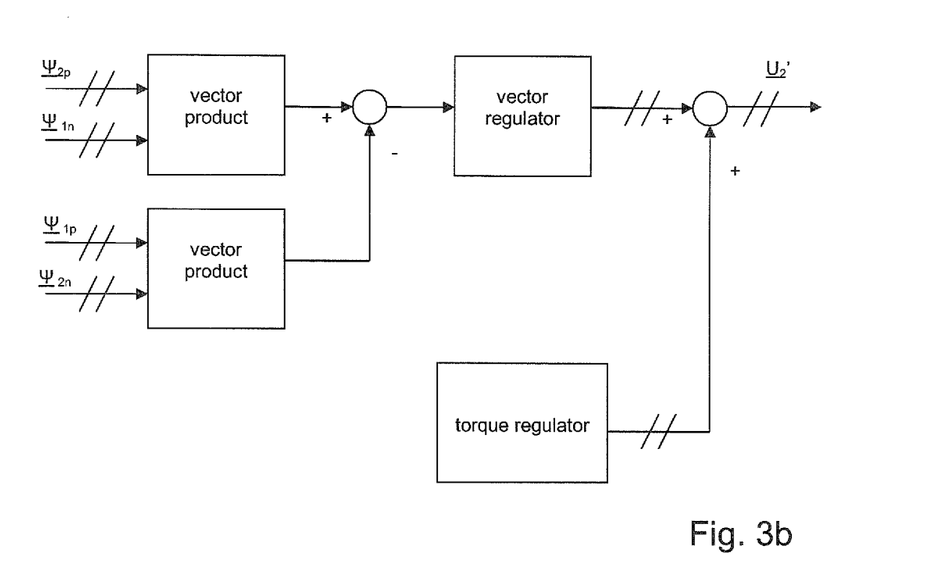

In the control variant shown in FIG. 3b, corresponding to above-discussed case (b), only the positive and negative sequence systems of the basic oscillation of the rotor and stator flux are considered, in which respect all flux components shown in FIG. 3b are to be present in the spatial vector illustration. As shown hereinbefore therefore the angle between rotor and stator flux and thus also the mean air gap moment of the generator can be freely adjusted.

The two flux components $\psi_{2p}$ and $\psi_{1p}$ are predetermined by the primary regulation, and the value $\psi_{1n}$ is virtually impressed by the feed-in mains. The vector regulator operating in parallel with primary regulation, as shown in FIG. 3b, impresses on the rotor voltage an additional value in such a form that the vector products $\psi_{2p} \times \psi_{1n}$ and $\psi_{1p} \times \psi_{2n}$, are equal, at least to such an extent as the adjusting range of the converter allows. That provides that the pendulum air gap moment at double the mains frequency is eliminated.

The operation of determining the modal components for pendulum moment suppression is described in detail in the following section with reference to FIGS. 4 to 8.

Figure 4:
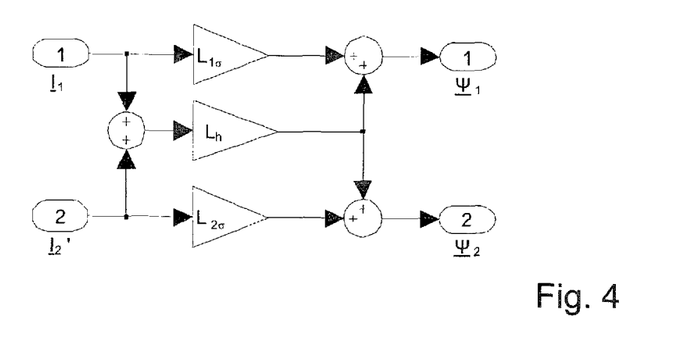
FIG. 4 shows a block diagram of a flux monitor.

Flux Monitor:

The flux monitor comprises the current model shown in FIG. 4 and operates in accordance with the following equations:

$$\underline{\psi}_1 = L_h(\underline{I}_1 + \underline{I}_2') + L_{1\sigma}\underline{I}_1$$

$$\underline{\psi}_2 = L_h(\underline{I}_1 + \underline{I}_2') + L_{2\sigma}\underline{I}_2' \qquad (19, 20)$$

The foregoing equations for determining the flux are implemented in the block diagram shown in FIG. 4.

In a further embodiment it is alternatively also possible to use a voltage model of the double-fed asynchronous machine or a combination of both models.

The input values in FIG. 4 are the measured stator current $I_1$ and the measured rotor current $I_2'$ which is transformed into a stator-related co-ordinate system and multiplied by the transmission ratio (rotor/stator). Those values are processed in vectorial form (in the $\alpha/\beta$ system).

Figure 5:
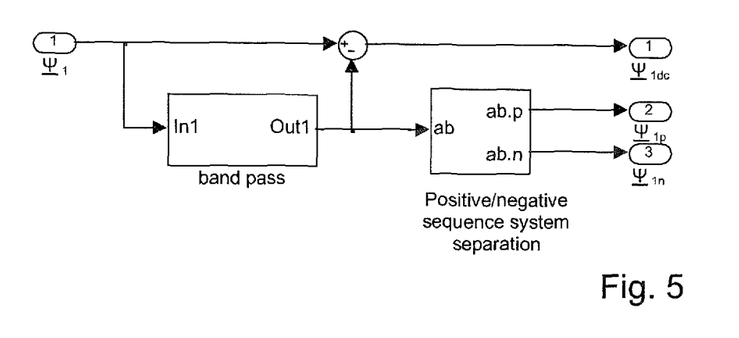
FIG. 5 shows a block diagram with a diagrammatic view of modal decomposition.

Modal Components of the Fluxes:

The operation of determining the modal components is effected as diagrammatically shown in FIG. 5. On the above-indicated assumption that the fluxes only have DC and mains-frequency components, firstly the mains-frequency component is filtered out of the overall spatial vector of the respective flux with a band pass. When that component is deducted from the original signal the DC component is established.

The mains-frequency components are now decomposed with a suitable method into positive and negative sequence system.

Such methods are described for example in "Leistungsregelung von Windkraftanlagen mit doppeltgespeister Asynchronmaschine bei Netzunsymmetrie", S. M.-Engelhardt, H. Wrede, J. Kretschmann, VDI-Berichte No. 1963, 2006, wherein that document is made subject-matter of the present disclosure in respect of those methods. In particular in accordance with the specified document methods of separation into positive and negative sequence systems are proposed— briefly outlined hereinafter:

In accordance with a first method filtering of the signals is effected as follows: as the instantaneous values do not allow separation of positive and negative sequence systems, the spatial vector is firstly to be generated with a known transformation to the α/β system which is fixed in relation to the stator, in which the negative sequence system is represented as a mathematically negatively rotating 50 (or 60) Hz system. To separate negatively and positively rotating systems from each other in the time domain, it is necessary to implement a phase shift as a filter is basically not suitable for that purpose. The phase shift can be very easily carried out in relation to a vector by angle transformation. In the present case a frequency displacement through 50 (60) Hz is selected as negative as then the negative sequence system becomes equality. The positive sequence system is in the form of a 100 (120) Hz component. In that way it is possible on the one hand to use a low pass for separation of the signals while on the other hand there are no particular dynamic demands in terms of regulation. It is possible to use a relatively slow regulator to minimize side effects on the positive sequence system regulation.

Frequency transformation itself is to be implemented with a relatively harmonics-free angle to minimize coupling-in of interference. A fixed presetting in respect of the transformation frequency would be ideal; in that case however, in relation to mains frequencies not equal to 50 (60) Hz which are to be expected in future in weaker networks, the negative sequence system would no longer involve equality but would be at lower frequency. That would have an adverse effect on the requirement for decoupling of positive and negative sequence system regulation as phase transit times become increasingly dominant in the event of greater departures from the nominal frequency and result in a reduced stability limit.

A good compromise involves generation of the transformation angle from the phase angle of the mains voltage spatial vector with subsequent smoothing by way of a PLL with a low cut-off frequency.

In accordance with a further method filtering can be effected as proposed in H. Wrede. "Beiträge zur Erhöhung von Versorgungssicherheit und Spannungsqualität in der Übertragung und Verteilung elektrischer Energie durch leistungselektronische Betriebsmittel", Aachen, Shaker Verlag, 2004, pages 45ff.

In addition to the above-described signal decomposition, calculation of the reduction factor $k_{red}$ is effected in accordance with equations (15) and (16).

Figure 6:
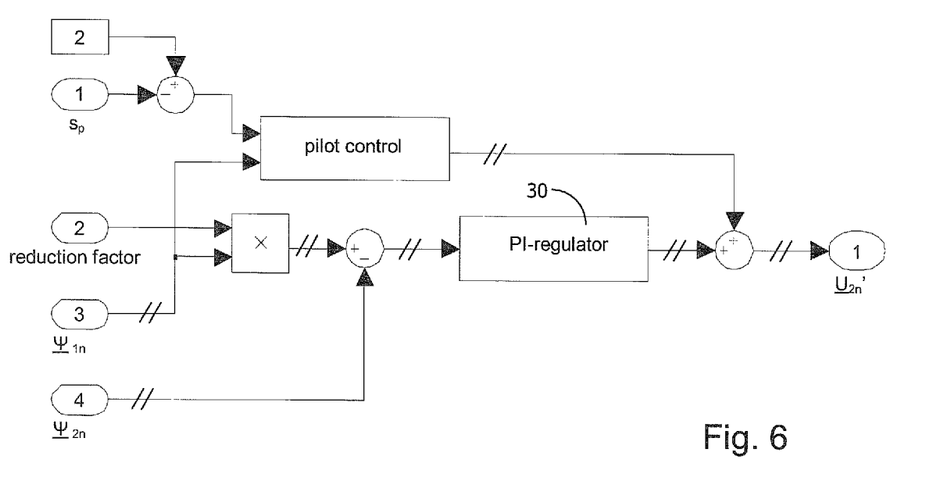
FIG. 6 shows a block diagram of flux regulation for the negative sequence system components.

Control Variant as Shown in FIG. 3a:

Actual regulation of the rotor voltage involves respectively using a flux regulator for the positive sequence system component, the negative sequence system component and the DC component, which is shown by reference to the example of the negative sequence system regulator in FIG. 6, by way of example as a magnitude/angle regulator with pilot control.

Other regulator forms are also possible. The regulators for the positive sequence system and the DC components are preferably of a similar nature.

Regulation is effected in the embodiment in accordance with equations (15)-(17).

Accordingly the rotor voltage, for compensation of the reduced component of the stator negative sequence system flux, is calculated as follows:

$$\underline{U}_{2n}' = -j2\pi(2-s_p)f_{Network}k_{red}\underline{\psi}_{1n} \quad (21)$$

That input-controlled value is so adapted by the PI regulator 30, in respect of the difference in the fluxes, that the rotor flux component assumes the above-described values.

In particular the vector of $\underline{\psi}_2$ and the vector of $\underline{\psi}_1 k_{red}$ are respectively fed into the PI regulator 30 as reference and actual values respectively, whereby regulation is effected to a reference condition in accordance with equation (17).

The rotor voltage, obtained in that way, for compensation of the reduced component of the stator negative sequence system flux is finally impressed on the rotor voltage by way of the rotor-side converter 6.

The other components for compensation of the stator positive sequence system flux and the stator flux DC components are ascertained in similar fashion and additively superposed, as shown in FIG. 3a.

Control Variant as Shown in FIG. 3b:

In regard to a detailed description for deriving the torque components and the required flux model, attention is directed to the foregoing description.

The torque-proportional components are calculated as:

$$t_1 = \psi_{2p,alpha} \cdot \psi_{1n,beta} - \psi_{2p,beta} \cdot \psi_{1n,alpha}$$

$$t_2 = \psi_{1p,alpha} \cdot \psi_{2n,beta} - \psi_{1p,beta} \cdot \psi_{2n,alpha} \quad (22a, b);$$

these are sine values of double the mains frequency.

Figure 8:
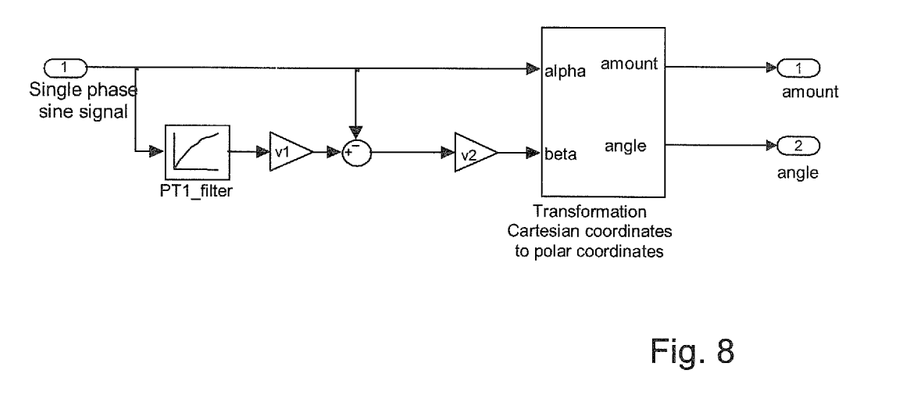
FIG. 8 shows a diagram for obtaining a virtual spatial vector.

To bring those two values into conformity in respect of magnitude and phase position a respective virtual spatial vector is generated in a similar manner to the method according to Lê, see FIG. 8.

Figure 7:
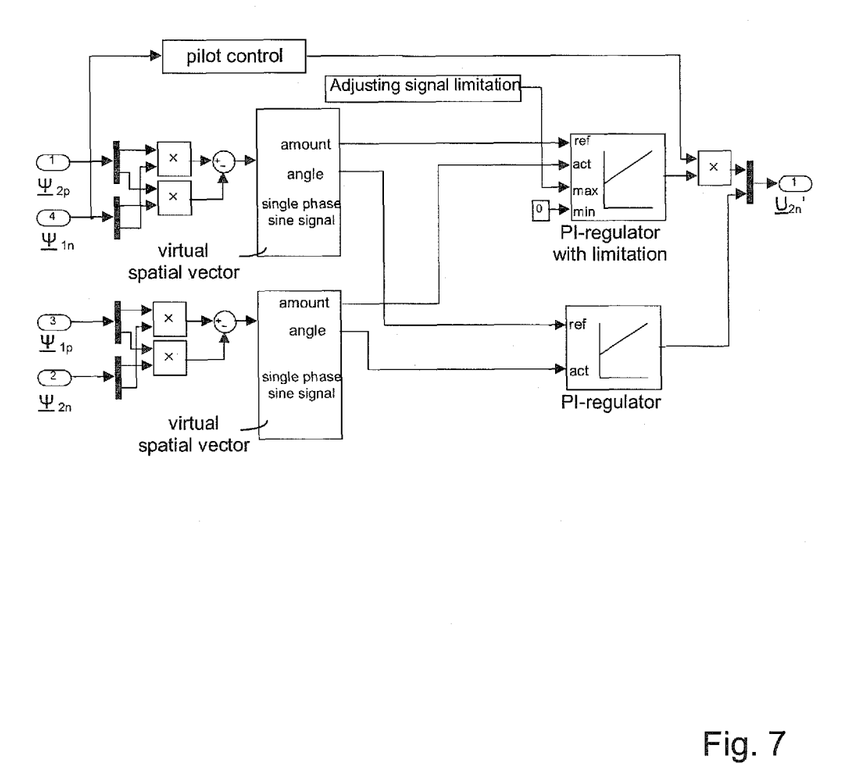
FIG. 7 shows a block diagram of flux regulation for an alternative embodiment of the invention, in which the negative cross-product of stator flux positive sequence system and rotor flux negative sequence system as well as the cross-product of stator flux negative sequence system and rotor flux positive sequence system are regulated as far as possible to equal values in respect of magnitude and phase position.

The difference in magnitude and angle is then eliminated with two PI regulators, see the view in FIG. 7.

To provide a faster control performance it is appropriate to implement pilot control of the induction voltage from the stator flux negative sequence system. That voltage then only has to be corrected in magnitude and angle by the regulators.

In accordance with the foregoing description, adjusting signal limitation is required for the regulator, for stability reasons and for prioritization of the positive and negative sequence system regulation.

Selection of the Various Control Modes:

Regulation as shown in FIG. 3a is preferably activated after major disturbances in the supply mains if the priority of regulation is at a limit of the maximum loading of the drive train of the system and greater direct-current components (DC components) occur, which lead to marked torque loadings. In those cases torque regulation is not absolutely necessary.

After decay of the DC components and in fault-free operation of the system torque regulation is in the foreground so that the regulation as shown in FIG. 3b is activated. With that variant, torque regulation is possible, with simultaneous elimination or reduction of the pendulum moments at double the mains frequency, in the case of a static mains asymmetry.

What is claimed is:

1. A method for compensating rotor torque harmonics in a double-fed asynchronous machine fed by a frequency converter controlled by a control unit, comprising the steps of:

measuring at least one current machine parameter or deriving at least one current machine parameter from machine measurement parameters;

decomposing the at least one current machine parameter into a positive system component and a negative system component;

supplying the positive system component of the at least one machine parameter to an input of a first control member and supplying the negative system component of the at least one machine parameter to an input of a second control member;

adding a first output value from the first control member and a second output value from the second control member to produce a control variable; and controlling the control variable so as to counteract torque oscillations.

2. The method of claim 1, wherein the at least one current machine parameter is further decomposed into DC component, and further comprising the step of supplying the DC component of the at least one machine parameter to an input of a third control member, and adding a third output value from the third control member to the first and second output values.

3. The method of claim 1, wherein the at least one machine parameter comprises one or more machine parameters selected from the group of a current rotor flux vector and a current stator flux vector; a network voltage and a network current; a stator voltage and a stator current, a rotor voltage and a rotor current, and a voltage and a current at a network-side converter member of the frequency converter.

4. A method for compensating rotor torque harmonics in a double-fed asynchronous machine fed by a frequency converter controlled by a control unit, comprising the steps of:

measuring at least one current machine parameter or deriving at least one current machine parameter from machine measurement parameters;

decomposing the at least one current machine parameter into a positive system component and a negative system component;

supplying to at least one control member a cross-product of the positive system component and the negative system component, and a cross-product of the negative system component and the positive system component as an input value to produce at an output of the at least one control member a control variable; and controlling the control variable so as to counteract second-order torque oscillations.

5. The method of claim 1, and further providing additional fourth control members for suppressing higher-order harmonics of a mains frequency.

6. The method of claim 5, wherein the higher-order harmonics are sixth and the twelfth harmonics.

7. The method for claim 1, wherein the at least one machine parameter comprises a current stator flux vector and a current rotor flux vector which are computed with a flux monitor from actual measured current and voltage values of the machine, wherein positive system components of the rotor and the stator are supplied to the input of the first control member and the negative system components of the rotor and the stator are supplied to the input of the second control member, and wherein the control variable comprises a phase shift $\phi_0$ and a reduction factor $k_{red}$ and the following relationship between the stator and rotor flux vectors is controlled:

$$\frac{|\underline{\psi}_{1p}|}{|\underline{\psi}'_{2p}|} = \frac{|\underline{\psi}_{1n}|}{|\underline{\psi}'_{2n}|} = \frac{1}{k_{red}} \text{ and}$$

$$\angle\underline{\psi}'_{2p} = \angle\underline{\psi}_{1p} + \phi_0 \text{ and } \angle\underline{\psi}'_{2n} = \angle\underline{\psi}_{1n} - \phi_0$$

with $\psi_{1p}$ and $\psi_{2p}'$ representing positive system components of the stator and rotor, respectively, $\psi_{1n}$ and $\psi_{2n}'$ representing negative system components of the stator and rotor, respectively, wherein the phase shift $\phi_0$ is adjusted to adjust a resulting torque, and $k_{red}$ is selected in dependence on a maximum available adjusting value of the rotor voltage.

8. The method for claim 2, wherein the at least one machine parameter comprises a current stator flux vector and a current rotor flux vector which are computed with a flux monitor from actual measured current and voltage values of the machine, wherein positive system components of the rotor and the stator are supplied to the input of the first control member and the negative system components of the rotor and the stator are supplied to the input of the second control member, and the DC components of the current stator flux vector and a current rotor flux vector are supplied to the input of the third control member, wherein the control variable comprises a reduction factor $k_{red}$ and the following relationship between the stator and rotor flux vectors is controlled for a total torque of zero:

$$\frac{|\underline{\psi}_{1p}|}{|\underline{\psi}'_{2p}|} = \frac{|\underline{\psi}_{1n}|}{|\underline{\psi}'_{2n}|} = \frac{|\underline{\psi}_{1dc}|}{|\underline{\psi}'_{2dc}|} = \frac{1}{k_{red}} \text{ and}$$

$$\angle\underline{\psi}'_{2p} = \angle\underline{\psi}_{1p} \text{ and } \angle\underline{\psi}'_{2n} = \angle\underline{\psi}_{1n} \text{ and } \angle\underline{\psi}'_{2dc} = \angle\underline{\psi}'_{1dc}$$

wherein $k_{red}$ is selected in dependence on a maximum available adjusting value of the rotor voltage.

9. A control unit for controlling a double-fed asynchronous machine in the event of occurrence of mains asymmetries, wherein the machine comprises a frequency converter actuated by the control unit, the control unit controlling the converter in regard to a predetermined control strategy, wherein the control unit compensates rotor torque harmonics by performing the method of claim 1.

10. The method of claim 1, wherein the rotor torque harmonics comprise second harmonics.

11. The method of claim 1, wherein the double-fed asynchronous machine is a separate exited three-phase machine.

12. The method of claim 4, wherein the at least one machine parameter comprises one or more machine parameters selected from the group of a current rotor flux vector and a current stator flux vector; a network voltage and a network current; a stator voltage and a stator current, a rotor voltage and a rotor current, and a voltage and a current at a network-side converter member of the frequency converter.

13. The method of claim 4, wherein the at least one machine parameter comprises a current stator flux vector and a current rotor flux vector which are computed with a flux monitor from actual measured current and voltage values of the machine, and wherein the control variable is a negative system component of the rotor flux, which is controlled in such a way that a negative vector product of a positive system component of the stator flux with the negative sequence system component of the rotor flux is equal to a vector product of a negative sequence system component of the stator flux with a positive sequence system component of the rotor flux expressed as $$-\underline{\psi}_{1p} \times \underline{\psi}_{2n}' = \underline{\psi}_{1n} \times \underline{\psi}_{2p}',$$

wherein $\underline{\psi}_{1p}$ and $\underline{\psi}_{2p}'$ represent the positive system components of the stator and rotor, respectively, and $\underline{\psi}_{1n}$ and $\underline{\psi}_{2n}'$ represent the negative system components of the stator and rotor, respectively.

14. The method of claim 13, wherein the control variable is controlled by generating a virtual spatial vector and eliminating a difference in respect of magnitude and phase is eliminated with two PI regulators with a feed-forward term.

15. The method of claim 14, wherein the control variable is controlled by limiting a control signal of a rotor-side inverter of the converter by taking into consideration a maximum available control signal.

16. A control unit for controlling a double-fed asynchronous machine in the event of occurrence of mains asymmetries, wherein the machine comprises a frequency converter actuated by the control unit, the control unit controlling the converter in regard to a predetermined control strategy, wherein the control unit compensates rotor torque harmonics by performing the method of claim 4.

17. The method of claim 4, wherein the double-fed asynchronous machine is a separate exited three-phase machine.

* * * * *

UNITED STATES PATENT AND TRADEMARK OFFICE
CERTIFICATE OF CORRECTION

| | | |
|---|---|---|
| PATENT NO. | : 8,415,818 B2 | Page 1 of 1 |
| APPLICATION NO. | : 12/674278 | |
| DATED | : April 9, 2013 | |
| INVENTOR(S) | : Engelhardt et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this
Fourth Day of March, 2014

Michelle K. Lee
*Deputy Director of the United States Patent and Trademark Office*